United States Patent Office 3,019,238
Patented Jan. 30, 1962

3,019,238
PROCESS FOR OXIDATION OF 11-HYDROXY-
STEROIDS TO 11-KETOSTEROIDS
Edwin F. Whiting, Portage Township, Kalamazoo County, and Alexander W. Schneider, Kalamazoo, Mich., assignors to The Upjohn Company, Kalamazoo, Mich., a corporation of Michigan
No Drawing. Filed Aug. 25, 1958, Ser. No. 757,097
13 Claims. (Cl. 260—397.3)

This invention relates to a novel process for the oxidation of 11-hydroxysteroid compounds to produce the corresponding 11-ketosteroid compounds. In its broad aspect the invention relates to an improvement in the process for converting an 11-hydroxysteroid compound to the corresponding 11-ketosteroid compound by oxidation with chromic acid, wherein the oxidation is accomplished by novel methods. More particularly, the invention relates to a novel process for oxidizing certain 11-hydroxysteroid compounds to the corresponding 11-ketosteroid compounds by means of chromic acid in accordance with conditions to be described in detail hereinafter, said 11-hydroxysteroid compounds being selected from the group consisting of 11-hydroxyprogesterone, hydrocortisone 21-carboxylic acylates, 1-dehydrohydrocortisone 21-carboxylic acylates, nuclear methyl and halo derivatives thereof, 5,11-dihydroxy-6-halopregnane-3,20-dione, and 5,11-dihydroxy-6-methylpregnane-3,20-dione.

Typical 11-hydroxy compounds which can be oxidized to the corresponding 11-keto compounds in accordance with this invention include hydrocortisone 21-acetate, 11α-hydroxyprogesterone, 6α-fluoro-11α-hydroxyprogesterone, 6α-methyl-11α-hydroxyprogesterone, 1-dehydrohydrocortisone 21-acetate, 5α,11β-dihydroxy-6β-fluoropregnane-3,20-dione, 5α,11α-dihydroxy-6β-methylpregnane-3,20-dione, 6α-fluorohydrocortisone 21-acetate, 6α-fluoro-1-dehydrohydrocortisone 21-acetate, 6α-fluoro-16α-methylhydrocortisone 21-acetate, 9α-fluorohydrocortisone 21-acetate, 16α-methylhydrocortisone 21-acetate, 16α-methyl-1-dehydrohydrocortisone 21-acetate, 9α-bromohydrocortisone 21-acetate, 9α-chlorohydrocortisone 21-acetate, and 6α-methylhydrocortisone 21-acetate.

The production of 11-ketosteroids by the chromic acid oxidation of 11-hydroxysteroids is generally known. Principal advantages of this invention over prior processes are (1) shorter operating time, (2) reduction in labor requirements, (3) simplified isolation of product, thus minimizing the loss of yield ordinarily incurred in obtaining a pure product, e.g., by recrystallization, and (4) use of high concentration of 11-hydroxy compound in the chromic acid oxidation, thus increasing the technical capacity of equipment.

Reichstein and Von Euw [Helv. chim. Acta 24E, 247 (1941)] and Von Euw and Reichstein [Helv. chim. Acta 25, 988 (1942)] carried out chromic acid oxidation of 11-hydroxysteroids to 11-ketosteroids on very low concentrations of steroid dissolved in acetic acid. Sixteen hours were required for completion of the oxidation. Fried and Sabo [J. Am. Chem. Soc. 79, 1130 (1957)] described the oxidation of 9α-fluorohydrocortisone 21-acetate to the corresponding 11-keto compound, wherein a low concentration (approximately 2.3%) of the steroid dissolved in acetic acid was oxidized with chromic acid. Recrystallization was required for the production of a 72% yield of pure compound.

Thus, the various prior art processes outlined above disclose the chromic acid oxidation of 11-hydroxysteroids to 11-ketosteroids, but none possess the convenience and advantages of the present invention. The novel process of this invention makes it possible to carry out the oxidation of 11-hydroxysteroids under conditions more favorable than those described in the prior art; e.g., surprisingly high concentration of starting 11-hydroxy compound and simplified isolation of 11-keto product in excellent yield and purity.

In carrying out the process of the present invention, an 11-hydroxy compound, particularly an 11-hydroxy compound selected from the group consisting of 11-hydroxyprogesterone, hydrocortisone 21-carboxylic acylates, 1-dehydrohydrocortisone 21-carboxylic acylates, nuclear methyl and halo derivatives thereof, 5,11-dihydroxy-6-halopregnane-3,20-dione, and 5,11-dihydroxy-6-methylpregnane-3,20-dione, is subjected to oxidation with chromic acid in an inert reaction medium to produce the corresponding 11-ketosteroid compound. The inert reaction medium comprises a dialkyl ketone having from three to four carbon atoms, i.e., acetone (preferred) and methyl ethyl ketone. Advantageously, the weight ratio of the 11-hydroxy compound to the dialkyl ketone can vary from about 1:20 to about 1:1.5, preferably from about 1:12 to about 1:3.

Because of high concentration of the starting 11-hydroxy compound, in most instances a substantial amount of 11-hydroxy reactant initially present in the reaction mixture is present in suspended form, e.g., slurried form, and as the reaction proceeds, the 11-keto product is usually also present in suspended form. Under these reaction conditions the oxidation is ordinarily carried out in a reaction mixture prepared by adding chromic acid to a solid-liquid system wherein the liquid phase comprises the dialkyl ketone and the solid phase comprises undissolved 11-hydroxy compound.

The dialkyl ketone employed as inert reaction medium need not be anhydrous, although the presence of sufficient water to lead to the formation of two liquid phases during the reaction is undesirable, e.g., as might occur in the case of methyl ethyl ketone. Ordinarily, if water is present in the reaction medium, it is preferred that the dialkyl ketone-water mixture contain not more than, say, about 40% of water, by weight, even when the dialkyl ketone is miscible with water in all proportions.

The chromic acid employed as oxidizing agent in the process of the invention comprises an aqueous solution of chromic acid. This aqueous oxidizing medium can be prepared in a variety of ways, such as by dissolving chromium trioxide in water and adding sulfuric acid to the resulting solution. Alkali metal dichromates and chromates, such as sodium dichromate dihydrate, sodium chromate, or potassium chromate, can be used instead of chromium trioxide. Likewise, other mineral acids such as phosphoric acid, or sulfonic acids such as para-toluenesulfonic acid, can be used instead of sulfuric acid, the function of the particular acid used merely being to furnish hydrogen ions in the oxidizing medium.

Stoichiometrically, the molar ratio of 11-hydroxy compound to chromic acid is 1:0.67. This is illustrated in the following equation showing the overall result of the oxidation of hydrocortisone 21-acetate to cortisone 21-acetate in accordance with an embodiment of this invention, it being understood that the 2 moles of chromium trioxide shown in the equation are equivalent to 2 moles of chromic acid:

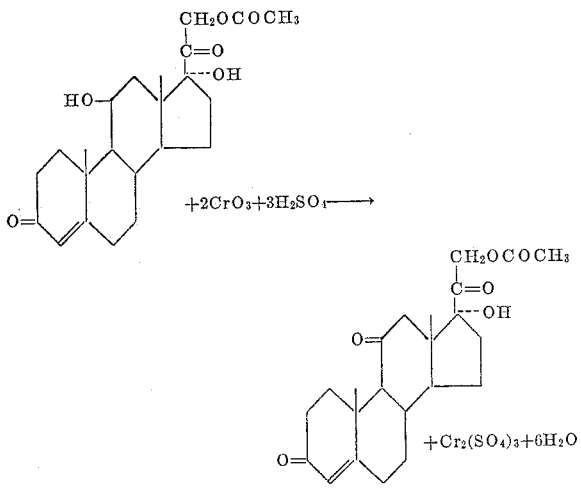

Although the process of the invention can be carried out using stoichiometric amounts of reactants, it is preferred that the chromic acid be employed in excess. It is preferred to employ a molar ratio of 11-hydroxy compound to chromic acid of at least 1:1, such as between 1:1 and 1:1.5 and more particularly between 1:1 and 1:1.33. Illustratively, excellent results have been obtained using a molar ratio of 11-hydroxy compound to chromic acid of about 1:1.25.

A broad aspect of this invention therefore is, in a process for converting an 11-hydroxysteroid compound to the corresponding 11-ketosteroid compound wherein the conversion is accomplished by oxidation with chromic acid, the improvement which comprises carrying out the oxidation by adding the chromic acid to the 11-hydroxy compound in a reaction medium comprising a dialkyl ketone having from 3 to 4 carbon atoms, the weight ratio of 11-hydroxy compound to dialkyl ketone being within the range of from about 1:20 to about 1:1.5.

The process of the invention is carried out by bringing the aqueous solution of chromic acid and the 11-hydroxy compound into contact with each other, the 11-hydroxy compound being present in the dialkyl ketone medium. It is preferred to add the chromic acid to the 11-hydroxy compound. The reaction is preferably carried out under conditions of continual stirring or other agitation. The reaction, which is exothermic, is carried out below about 75° C., the temperature range of from about 0° C. to about 60° C. being preferred, with about 20° to about 50° C. being a particularly satisfactory temperature range. One advantage of the process is the rapidity with which the oxidation occurs, and the chromic acid can be added continuously or portionwise over a short period of time. In some instances the time can be as little as 4 or 5 minutes, or even less, particularly when employing the higher reaction temperatures and/or when operating on a small scale. In other instances it may be desirable to add the chromic acid over a longer period of time, such as up to 1 or 2 hours, or even somewhat greater, particularly when employing the lower reaction temperatures and/or when operating on a large scale. At times the heat of reaction will be sufficient to maintain the reaction mixture within the desired temperature range, while at other times external heating or cooling may be required, as will be obvious to the skilled operator. It is pointed out that when converting an 11-hydroxy compound to the corresponding 11-keto compound in accordance with this invention many variations are possible, such as the particular 11-hydroxy compound being oxidized, the particular dialkyl ketone employed as reaction medium, the amount of water which may be present in the dialkyl ketone, the weight ratio of 11-hydroxy compound to dialkyl ketone, the concentration of the aqueous solution of chromic acid, the molar ratio of 11-hydroxy compound to chromic acid, the scale on which the reaction is being carried out, etc. Therefore it is not possible to give any particular reaction time and temperature range which is optimum for all conditions. Accordingly, it will be understood that optimum reaction time and temperature will depend upon prevailing conditions, so that the selection of time and temperature to be employed for the oxidation is a matter of choice and judgment. In any event, it is preferred that the reaction temperature be as low as is consistent with a reasonable rate of reaction, and that the reaction time be as short as is consistent with carrying the reaction substantially to completion.

After all the chromic acid has been added, it is desirable although not essential to continue agitation of the reaction mixture for a short time, such as 5 to 30 minutes, in order to insure completeness of reaction. The desired 11-keto product can be isolated in excellent yield and purity from the reaction mixture, merely by the use of simple techniques. An excellent technique wherein the product is obtained as a single crop consists of adding water to the reaction mixture, adjusting the temperature of the resulting mixture to about 0 to 20° C., separating the solid 11-keto compound, such as by filtration or centrifugation, and washing the 11-keto compound with water in order to remove water-soluble contaminants such as acids, chromium salts, etc., and drying, if so desired. In many instances addition of water to the reaction mixture can be omitted without causing any substantial loss in yield, particularly when the 11-keto compound is present in high concentration or has a low order of solubility in the dialkyl ketone. A further modification of technique wherein the product is obtained in two crops consists of adjusting the temperature of the reaction mixture to about 0 to 20° C., separating the first crop of solid 11-keto compound, and washing it with water. The liquid phase (e.g., filtrate) is mixed with water in order to precipitate a second crop of solid 11-keto compound, which is then separated and washed. Ordinarily, the purity of the 11-keto product obtained by such procedures is highly satisfactory, and the product can be used without further purification for various purposes, such as in pharmaceutical formulations or as an intermediate for further chemical processing.

The following examples are illustrative of the present invention but are not to be construed as limiting.

EXAMPLE 1

*Cortisone 21-acetate (17α-hydroxy-21-acetoxy-4-pregnene-3,11,20-trione)*

Chromic acid reagent was prepared by adding 176 gm. (1.76 moles) of chromium trioxide to 507 ml. of deionized water and stirring until solution was complete, then slowly adding thereto 151 ml. of concentrated sulfuric acid while stirring was continued. 570 gm. (1.409 moles) of hydrocortisone 21-acetate was suspended in 4,275 ml. of acetone, and to this suspension the chromic acid reagent was added with continuous stirring during a period of 11 minutes. Approximately 15% of the chromic acid reagent was added rapidly and steadily to the steroid suspension, during which addition the temperature of the reaction mixture rose to 40° C. Further additions of chromic acid reagent were made at a rate that kept the temperature of the reaction mixture between 40 and 45° C. with the aid of external cooling. After the addition of the chromic acid reagent was completed, the reaction mixture was stirred for a period of 10 minutes at 40 to 45° C. 4,275 ml. of deionized water was then added and the mixture was cooled to a temperature of between 12 and 15° C. The mixture was filtered and the filter cake was thoroughly washed with deionized water. The washed filter cake was dried in a vacuum oven at 95° C. There was thus obtained 502 gm. (88% of theoretical) of cortisone 21-acetate with a melting point of 240 to 244° C. and an optical rotation $[\alpha]_D$ of +218° (dioxane).

This product contained approximately 0.5% of hydrocortisone 21-acetate.

Substitution of other hydrocortisone 21-carboxylic acylates in place of hydrocortisone 21-acetate in the procedure of the foregoing example is productive of the corresponding cortisone 21-acylates. Thus, hydrocortisone 21-propionate, 21-isobutyrate, 21-valerate, 21-caprylate, 21-propiolate, 21-benzoate, 21-cyclopentylpropionate, 21-phenylacetate, 21-trimethylacetate, 21-ethylbutyrate, 21-dodecanoate, or the 21-cyclohexylacetate is productive of cortisone 21-propionate, 21-isobutyrate, 21-valerate, 21-caprylate, 21-propiolate, 21-benzoate, 21-cyclopentylpropionate, 21-phenylacetate, 21-trimethylacetate, 21-ethylbutyrate, 21-dodecanoate, and 21-cyclohexylacetate, respectively.

EXAMPLE 2

Cortisone 21-acetate 100 gm. of hydrocortisone 21-acetate was suspended in 500 ml. of acetone, and to this suspension 110 ml. of chromic acid reagent, prepared as in Example 1, was slowly added with continuous stirring during a period of 30 minutes. The temperature of the reaction mixture rose to 35° C. and was thereafter maintained within a range of 35 to 50° C. After the addition of the chromic acid reagent was completed, the reaction mixture was stirred for a period of 10 minutes at 40 to 45° C. 750 ml. of deionized water was then added and the mixture was cooled to a temperature of between 12 and 15° C. The mixture was filtered and the filter cake was thoroughly washed with deionized water. The resulting filter cake was dried in a vacuum oven at 95° C. There was thus obtained 88 gm. (88% of theoretical) of cortisone 21-acetate with a melting point of 236 to 242° C. and an optical rotation $[\alpha]_D$ of $+216°$ (dioxane). This product contained approximately 0.5% of hydrocortisone 21-acetate.

EXAMPLE 3

Cortisone 21-acetate 570 gm. of hydrocortisone 21-acetate was suspended in 2,850 ml. of acetone, and to this suspension 627 ml. of chromic acid reagent, prepared as in Example 1, was slowly added with continuous stirring during a period of 135 minutes. The temperature of the reaction mixture rose to 35° C. and was thereafter maintained within a range of 35 to 50° C. After the addition of the chromic acid reagent was completed, the reaction mixture was stirred for a period of 10 minutes at 40 to 45° C. 4,275 ml. of deionized water was then added and the mixture was cooled to a temperature of between 12 and 15° C. The mixture was filtered and the filter cake was thoroughly washed with deionized water. The filter cake was dried in a vacuum oven at 95° C. There was thus obtained 481 gm. (84% of theoretical) of cortisone 21-acetate with a melting point of 240 to 244.5° C. and an optical rotation $[\alpha]_D$ of $+216°$ (dioxane). This product contained approximately 0.3% of hydrocortisone 21-acetate.

EXAMPLE 4

Cortisone 21-acetate 100 gm. of hydrocortisone 21-acetate was suspended in 750 ml. of acetone, and to this suspension 110 ml. of chromic acid reagent, prepared as in Example 1, was gradually added with continuous stirring during a period of 25 minutes. The temperature of the reaction mixture rose to 35° C. and was thereafter maintained within a range of 35 to 50° C. After the addition of the chromic acid reagent was completed, the reaction mixture was stirred for a period of 10 minutes at 40 to 45° C. 750 ml. of deionized water was then added and the mixture was cooled to a temperature of between 12 and 15° C. The mixture was filtered and the filter cake was thoroughly washed with deionized water. The filter cake was dried in a vacuum oven at 95° C. There was thus obtained 89 gm. (89% of theoretical) of cortisone 21-acetate with a melting point of 241.5 to 244.5° C. and an optical rotation $[\alpha]_D$ of $+218°$ (dioxane). This product contained approximately 0.5% of hydrocortisone 21-acetate.

EXAMPLE 5

Cortisone 21-acetate 10 gm. of hydrocortisone 21-acetate was suspended in 25 ml. of acetone, and to this suspension 11 ml. of chromic acid reagent, prepared as in Example 1, was added with continuous stirring during a period of about 5 minutes. The temperature of the reaction mixture rose to 60° C. during this addition. The reaction mixture was then cooled to about 15° C. and filtered. The filter cake was thoroughly washed with deionized water and dried in a vacuum oven at 95° C. There was thus obtained 8.4 gm. (84% of theoretical) of cortisone 21-acetate sufficiently pure for pharmaceutical use.

EXAMPLE 6

Cortisone 21-acetate 10 gm. of hydrocortisone 21-acetate was suspended in aqueous acetone prepared by mixing 50 ml. of water and 100 ml. of acetone, and to this suspension 11 ml. of chromic acid reagent, prepared as in Example 1, was added with continuous stirring during a period of fifteen minutes. The temperature of the reaction mixture rose to 40° C. during this addition. The reaction mixture was then cooled to about 15° C. and filtered. The filter cake was thoroughly washed with deionized water and dried in a vacuum oven at 95° C. There was thus obtained 8.5 gm. (85% of theoretical) of cortisone 21-acetate sufficiently pure for pharmaceutical use.

EXAMPLE 7

Cortisone 21-acetate 10 gm. of hydrocortisone 21-acetate was suspended in 150 ml. of acetone, and to this suspension 11 ml. of chromic acid reagent, prepared as in Example 1, was added with continuous stirring during a period of about 5 minutes. The temperature of the reaction mixture rose to 43° C. during this addition. The reaction mixture was then cooled to about 15° C. and filtered. The filter cake was thoroughly washed with deionized water and dried in a vacuum oven at 95° C. The cortisone 21-acetate thus obtained weighed 5.4 gm. (54% of theoretical). 1 l. of water was added to the filtrate to precipitate a second crop and the mixture was filtered. This filter cake was thoroughly washed with deionized water and dried in a vacuum oven at 95° C. The second crop of cortisone 21-acetate thus obtained weighed 3.6 gm. (36% of theoretical). The total yield of cortisone 21-acetate was 90%. Each crop contained approximately 0.5% of hydrocortisone 21-acetate.

The foregoing examples illustrate among other things the use of weight ratios of hydrocortisone 21-acetate to acetone of from 1:2 to 1:12. Similar results can be obtained using the other 11-hydroxysteroid compounds previously disclosed and/or using methyl ethyl ketone. The following examples are illustrative thereof.

EXAMPLE 8

11-ketoprogesterone 10 gm. of 11α-hydroxyprogesterone was suspended in 50 ml. of acetone, and to this suspension 13.2 ml. of chromic acid reagent, prepared as in Example 1, was slowly added with continuous stirring during a period of about 8 minutes. The temperature of the reaction mixture rose to 40° C. and was thereafter maintained within a range of 40 to 45° C. After the addition of the chromic acid reagent was completed, the reaction mixture was stirred for a period of 10 minutes at 40 to 45° C. 400 ml. of deionized water was then added and the mixture was cooled to a temperature of 12 to 15° C. The mixture was filtered and the filter cake was thoroughly washed with deionized water. The filter cake was dried in a vacuum oven at 95° C. and yielded 8.7 gm. (87% of theoretical) of 11-ketoprogesterone with a melting point of 166 to 171.5° C. and an optical rotaiton $[\alpha]_D$ of +270° (chloroform).

EXAMPLE 9

*1-dehydrocortisone 21-acetate*

10 gm. of 1-dehydrohydrocortisone 21-acetate was suspended in 75 ml. of acetone, and to this suspension 11 ml. of chromic acid reagent, prepared as in Example 1, was slowly added with continuous stirring during a period of 10 minutes. The temperature of the reaction mixture rose to 40° C. and was thereafter maintained within a range of 40 to 45° C. After the addition of the chromic acid reagent was completed, the reaction mixture was stirred for a period of 10 minutes at 40 to 45° C. 75 ml. of deionized water was then added and the mixture was cooled to a temperature of 12 to 15° C. The mixture was filtered and the filter cake was thoroughly washed with deionized water. The filter cake was dried in a vacuum oven at 95° C. There was thus obtained 8.5 gm. (85% of theoretical) of 1-dehydrocortisone 21-acetate with a melting point of 211 to 214° C. and an optical rotation $[\alpha]_D$ of +184° (dioxane).

EXAMPLE 10

*5α-hydroxy-6β-methylpregnane-3,11,20-trione*

10 gm. of 5α,11α-dihydroxy-6β-methylpregnane-3,20-dione was suspended in 75 ml. of acetone, and to this suspension 11 ml. of chromic acid reagent, prepared as in Example 1, was slowly added with continuous stirring during a period of 10 minutes. The temperature of the reaction mixture rose to 40° C. and was thereafter maintained within a range of 40 to 45° C. After the addition of the chromic acid reagent was completed, the reaction mixture was stirred for a period of 10 minutes at 40 to 45° C. 75 ml. of deionized water was then added and the mixture was cooled to a temperature of 12 to 15° C. The mixture was filtered and the filter cake was thoroughly washed with deionized water. The filter cake was dried in a vacuum oven at 95° C. There was thus obtained 9.0 gm. (90% of theoretical) of 5α-hydroxy-6β-methylpregnane-3,11,20-trione with a melting point of 229.5 to 233 degrees centigrade and an optical rotation $[\alpha]_D$ of +82° (chloroform).

EXAMPLE 11

*5α-hydroxy-6β-methylpregnane-3,11,20-trione*

10 gm. of 5α,11α-dihydroxy-6β-methylpregnane-3,20-dione was suspended in 75 ml. of methyl ethyl ketone, and to this suspension 11 ml. of chromic acid reagent, prepared as in Example 1, was slowly added with continuous stirring during a 6-minute period. The temperature of the reaction mixture rose to 40° C. and was thereafter maintained within a range of 40 to 45° C. After the addition of the chromic acid reagent was completed, the reaction mixture was stirred for a period of 10 minutes at 40 to 45° C. 75 ml. of deionized water was then added and the mixture was cooled to a temperature of about 15° C. The mixture was filtered and the filter cake was thoroughly washed with deionized water. The filter cake was dried in a vacuum oven at 95° C. There was thus obtained 8.5 gm. (85% of theoretical) of 5α-hydroxy-6β-methylpregnane-3,11,20-trione with a melting point of 225 to 229° C. and an optical rotation $[\alpha]_D$ of +81° (chloroform).

We claim:

1. A process for converting an 11-hydroxy compound selected from the group consisting of 11α-hydroxyprogesterone, hydrocortisone 21-carboxylic acylates, 1-dehydrohydrocortisone 21-carboxylic acylates, nuclear 6-methyl, 16-methyl, 6-fluoro and 9α-halo substituted derivatives thereof, 5α,11α-dihydroxy-6-halopregnane-3,20-dione, and 5α,11α-dihydroxy-6-methylpregnane-3,20-dione into the corresponding 11-keto compound, which comprises oxidizing the said 11-hydroxy compound in a reaction mixture prepared by adding chromic acid to said 11-hydroxy compound in a reaction medium comprising a dialkyl ketone having from 3 to 4 carbon atoms, the 11-hydroxy compound-dialkyl ketone weight ratio being within the range of from about 1:20 to about 1:1.5 prior to the addition of chromic acid; and recovering the resulting 11-keto compound from the reaction mixture.

2. A process according to claim 1 wherein the dialkyl ketone is acetone.

3. A process for converting an 11-hydroxy compound selected from the group consisting of 11α-hydroxyprogesterone, hydrocortisone 21-carboxylic acylates, 1-dehydrohydrocortisone 21-carboxylic acylates, nuclear 6-methyl, 16-methyl, 6-fluoro and 9α-halo substituted derivatives thereof, 5α,11α-dihydroxy-6-halopregnane-3,20-dione, and 5α,11α-dihydroxy-6-methylpregnane-3,20-dione into the corresponding 11-keto compound, which comprises oxidizing said 11-hydroxy compound in a reaction mixture prepared by adding chromic acid to a solid-liquid system wherein the liquid phase comprises a dialkyl ketone having from 3 to 4 carbon atoms, and the solid phase is selected from the group of 11-hydroxy compounds named above and the solid-liquid ratio has a range from about 1:20 to about 1:1.5; and recovering the resulting 11-keto compound from the reaction mixture.

4. A process for converting hydrocortisone 21-acetate to cortisone 21-acetate which comprises oxidizing hydrocortisone 21-acetate in a reaction mixture prepared by adding chromic acid to a solid-liquid system wherein the liquid phase comprises acetone and the solid phase comprises hydrocortisone 21-acetate and the solid-liquid ratio has a range from about 1:20 to about 1:1.5.

5. A process for converting 11α-hydroxyprogesterone to 11-ketoprogesterone which comprises oxidizing 11α-hydroxyprogesterone in a reaction mixture prepared by adding chromic acid to a solid-liquid system wherein the liquid phase comprises acetone and the solid phase comprises 11α-hydroxyprogesterone and the solid-liquid ratio has a range from about 1:20 to about 1:1.5.

6. A process for converting 1-dehydrohydrocortisone 21-acetate to 1-dehydrocortisone 21-acetate which comprises oxidizing 1-dehydrohydrocortisone 21-acetate in a reaction mixture prepared by adding chromic acid to a solid-liquid system wherein the liquid phase comprises acetone and the solid phase comprises 1-dehydrohydrocortisone 21-acetate and the solid-liquid ratio has a range from about 1:20 to about 1:1.5.

7. A process for converting 5α,11α-dihydroxy-6β-methylpregnane-3,20-dione to 5α-hydroxy-6β-methylpregnane-3,11,20-trione which comprises oxidizing 5α,11α-dihydroxy-6β-methylpregnane-3,20-dione in a reaction mixture prepared by adding chromic acid to a solid-liquid system wherein the liquid phase comprises acetone and the solid phase comprises 5α,11α-dihydroxy-6β-methylpregnane-3,20-dione and the solid-liquid ratio has a range from about 1:20 to about 1:1.5.

8. A process for converting 5α,11α-dihydroxy-6β-methylpregnane-3,20-dione to a 5α-hydroxy-6β-methylpregnane-3,11,20-trione which comprises oxidizing 5α,11α-dihydroxy-6β-methylpregnane-3,20-dione in a reaction mixture prepared by adding chromic acid to a solid-liquid system wherein the liquid phase comprises methyl ethyl ketone and the solid phase comprises 5α,11α-dihydroxy-6β-methylpregnane-3,20-dione and the solid-liquid ratio has a range from about 1:20 to about 1:1.5.

9. In a process for converting an 11-monohydroxysteroid compound to the corresponding 11-monoketosteroid compound wherein the conversion is accomplished by oxidation with chromic acid, the improvement which comprises carrying out the oxidation by adding the chromic acid to said 11-hydroxy compound in a reaction medium comprising a dialkyl ketone having from three to four carbon atoms, the weight ratio of 11-hydroxy compound to dialkyl ketone being within the range of from about 1:20 to about 1:1.5.

10. A process for converting hydrocortisone 21-acetate to cortisone 21-acetate, which comprises oxidizing hydrocortisone 21-acetate in a reaction mixture prepared by adding chromic acid thereto in a reaction medium comprising a dialkyl ketone having from 3 to 4 carbon atoms, the hydrocortisone 21-acetate-dialkyl ketone weight ratio being within the range of from about 1:20 to about 1:1.5 prior to the addition of chromic acid; and recovering the resulting cortisone 21-acetate from the reaction mixture.

11. A process for converting 11α-hydroxyprogesterone to 11-ketoprogesterone, which comprises oxidizing 11α-hydroxyprogesterone in a reaction mixture prepared by adding chromic acid thereto in a reaction medium comprising a dialkyl ketone having from 3 to 4 carbon atoms, the 11α-hydroxyprogesterone-dialkyl ketone weight ratio being within the range of from about 1:20 to about 1:1.5 prior to the addition of chromic acid; and recovering the resulting 11-ketoprogesterone from the reaction mixture.

12. A process for converting 1-dehydrohydrocortisone 21-acetate to 1-dehydrocortisone 21-acetate, which comprises oxidizing 1-dehydrohydrocortisone 21-acetate in a reaction mixture prepared by adding chromic acid thereto in a reaction medium comprising a dialkyl ketone having from 3 to 4 carbon atoms, the 1-dehydrohydrocortisone 21-acetate-dialkyl ketone weight ratio being within the range of from about 1:20 to about 1:1.5 prior to the addition of chromic acid; and recovering the resulting 1-dehydrocortisone 21-acetate from the reaction mixture.

13. A proces for converting 5α,11α-dihydroxy-6β-methylpregnane-3,20-dione to 5α-hydroxy-6β-methylpregnane-3,11,20-trione, which comprises oxidizing 5α,11α-dihydroxy-6β-methylpregnane-3,20-dione in a reaction mixture prepared by adding chromic acid thereto in a reaction medium comprising a dialkyl ketone having from 3 to 4 carbon atoms, the 5α,11α-dihydroxy-6β-methylpregnane-3,20-dione-dialkyl ketone weight ratio being within the range of from about 1:20 to about 1:1.5 prior to the addition of chromic acid; and recovering the resulting 5α - hydroxy - 6β-methylpregnane-3,11,20-trione from the reaction mixture.

References Cited in the file of this patent
UNITED STATES PATENTS

| | | |
|---|---|---|
| 2,813,108 | Hanze | Nov. 12, 1957 |
| 2,837,544 | Fried | June 3, 1958 |
| 2,854,453 | Chamberlin et al. | Sept. 30, 1958 |
| 2,880,217 | Thoma et al. | Mar. 31, 1959 |